United States Patent
Teramura

(10) Patent No.: US 9,575,431 B2
(45) Date of Patent: Feb. 21, 2017

(54) OPTICAL SCANNING APPARATUS AND IMAGE FORMING APPARATUS INCLUDING THE SAME

(71) Applicant: CANON KABUSHIKI KAISHA, Tokyo (JP)

(72) Inventor: Masayasu Teramura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 14/328,759

(22) Filed: Jul. 11, 2014

(65) Prior Publication Data
US 2015/0035929 A1 Feb. 5, 2015

(30) Foreign Application Priority Data
Aug. 5, 2013 (JP) .................................. 2013-162502

(51) Int. Cl.
*G03G 15/043* (2006.01)
*G02B 26/12* (2006.01)

(52) U.S. Cl.
CPC .......... *G03G 15/043* (2013.01); *G02B 26/127* (2013.01); *G03G 15/0435* (2013.01)

(58) Field of Classification Search
CPC .. G03G 15/043; G03G 15/0435; G02B 26/127
See application file for complete search history.

(56) References Cited

U.S. PATENT DOCUMENTS

| 4,829,175 A | * | 5/1989 | Goto et al. ................... 250/236 |
| 5,606,449 A | * | 2/1997 | Nishiyama ................. 359/210.1 |

(Continued)

FOREIGN PATENT DOCUMENTS

| JP | H06-018803 A | 1/1994 |
| JP | H07-128604 A | 5/1995 |

(Continued)

OTHER PUBLICATIONS

Japanese Office Action issued in corresponding application No. 2013-162502 on Jun. 9, 2015.

*Primary Examiner* — Sarah Al Hashimi
(74) *Attorney, Agent, or Firm* — Carter, DeLuca, Farrell & Schmidt, LLP

(57) ABSTRACT

Provided is an optical scanning apparatus which can achieve high resolution while reducing detection errors in the synchronous detection of a plurality of light fluxes by temperature fluctuations. An optical scanning apparatus according to this invention includes a light source having a plurality of light-emitting points, a deflection unit configured to deflect a plurality of light fluxes emitted by the plurality of light-emitting points, a scanning optical system configured to guide the plurality of light fluxes deflected by the deflection unit onto a scanned surface, and a synchronous detection unit configured to detect light fluxes from at least two light-emitting points of the plurality of light-emitting points. The synchronous detection unit includes a plurality of imaging elements. The first imaging element, of the plurality of imaging elements, which exhibits the smallest change in refractive index with respect to temperatures has the largest refractive power in a main scanning section.

18 Claims, 6 Drawing Sheets

(56) References Cited

U.S. PATENT DOCUMENTS

| | | | | |
|---|---|---|---|---|
| 5,963,356 | A * | 10/1999 | Kato | G02B 26/127 |
| | | | | 250/234 |
| 6,476,955 | B1 * | 11/2002 | Yoshida | G02B 26/123 |
| | | | | 250/235 |
| 6,570,696 | B2 * | 5/2003 | Ori | 359/207.6 |
| 2004/0179089 | A1 * | 9/2004 | Hayashi | 347/243 |
| 2004/0240016 | A1 * | 12/2004 | Shimomura | 359/196 |
| 2007/0253048 | A1 * | 11/2007 | Sakai et al. | 359/204 |

FOREIGN PATENT DOCUMENTS

| | | |
|---|---|---|
| JP | 2001-142019 A | 5/2001 |
| JP | 2002-333585 A | 11/2002 |
| JP | 2005-099336 A | 4/2005 |
| JP | 2008-064775 A | 3/2008 |
| JP | 2010-097106 A | 4/2010 |

* cited by examiner

OPTICAL SCANNING APPARATUS AND IMAGE FORMING APPARATUS INCLUDING THE SAME

BACKGROUND OF THE INVENTION

Field of the Invention

The present invention relates to an optical scanning apparatus and an image forming apparatus including the same and, more particularly, to the synchronous detection of a plurality of light fluxes in an optical scanning apparatus including a light source having a plurality of light-emitting points and a deflection unit such as a polygon mirror.

Description of the Related Art

There are currently demands for faster and smaller optical scanning apparatuses provided in image forming apparatuses such as laser beam printers and digital copying machines.

U.S. Pat. No. 6,476,955 discloses an optical scanning apparatus which includes a light source having a plurality of light-emitting points and can scan a scanned surface at once with a plurality of light fluxes (multibeam) in order to achieve high-speed scanning. This optical scanning apparatus causes a synchronous detection unit to electrically synchronously detect the positions of the dots formed by the respective light-emitting points, and electrically corrects write timings and image widths so as to accurately print an image.

In addition, U.S. Pat. No. 5,963,356 discloses a technique of integrating the optical element of an incidence optical system with the optical element of a synchronous detection unit, with light fluxes passing through the outside of a scanning optical system, in order to reduce the size of an optical scanning apparatus.

When, however, a multibeam is applied to the optical scanning apparatus disclosed in U.S. Pat. No. 5,963,356, since each optical element has a power within a main scanning section, the position of the dot formed by each light-emitting point is shifted by environmental fluctuations (for example, a temperature change). If the positional shift of each dot increases, the detection error in the synchronous detection unit increases, resulting in a failure in accurate printing.

According to the present invention, therefore, an optical scanning apparatus including a light source having a plurality of light-emitting points is required to reduce detection errors in the synchronous detection of a plurality of light fluxes which are caused by environmental fluctuations and to obtain a high resolution.

SUMMARY OF THE INVENTION

An optical scanning apparatus according to an aspect of the present invention comprises a light source having a plurality of light-emitting points, a deflection unit configured to deflect a plurality of light fluxes emitted by the plurality of light-emitting points, a scanning optical system configured to guide the plurality of light fluxes deflected by the deflection unit onto a scanned surface, and a synchronous detection unit configured to detect light fluxes from at least two light-emitting points of the plurality of light-emitting points, wherein the synchronous detection unit includes a plurality of imaging elements, and a first imaging element, of the plurality of imaging elements, which exhibits a smallest change in refractive index with respect to temperatures has a largest refractive power in a main scanning section.

Further features of the present invention will become apparent from the following description of exemplary embodiments with reference to the attached drawings.

DESCRIPTION OF THE EMBODIMENTS

An optical scanning apparatus according to the present invention will be described below with reference to the accompanying drawings. Note that the following drawings may be drawn in scales different from actual scales for easy understanding of the present invention.

Figure 1:
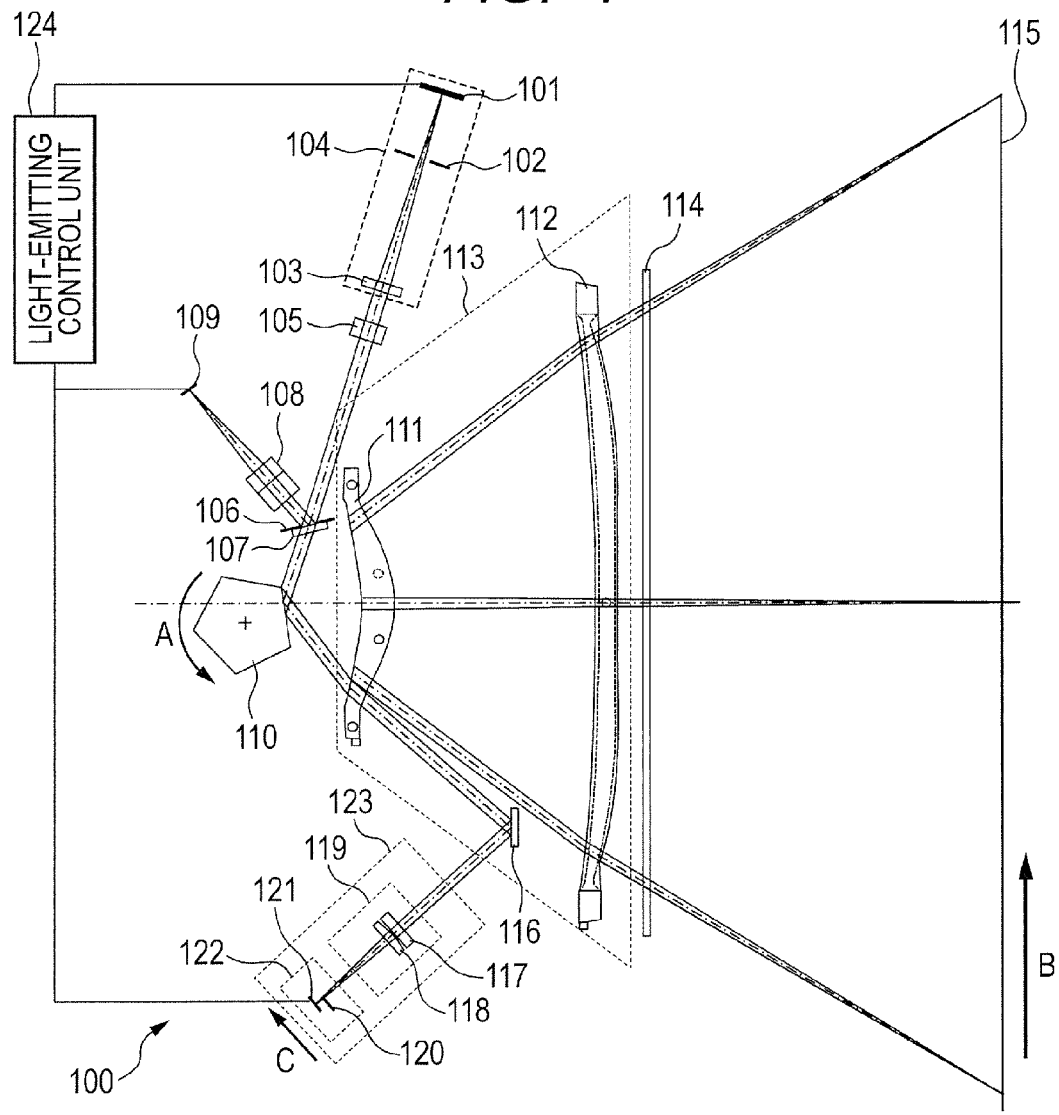
FIG. 1 is a schematic view of an optical scanning apparatus 100 according to the first embodiment of the present invention.

FIG. 1 is a schematic view of an optical scanning apparatus 100 according to the first embodiment of the present invention.

The optical scanning apparatus 100 includes a light source 101, an aperture stop 102, a collimator lens 103, and a cylindrical lens 105. The optical scanning apparatus 100 further includes an aperture stop 106, a light beam splitting element 107, an anamorphic lens 108, and a light amount detecting unit 109. The optical scanning apparatus also includes a deflection unit 110, a first fθ lens (scanning optical element) 111, a second fθ lens 112, a dustproof unit 114, and a scanned surface 115. In addition, the optical scanning apparatus 100 includes a deflection mirror 116, a first synchronous detection element 117, a second synchronous detection element 118, a light-shielding unit 120, a light-receiving element 121, and a light-emitting control unit 124. Note that the scanned surface 115 may be the surface of a photosensitive body.

Note that in the following description, a main scanning direction is a direction perpendicular to the rotational axis of the deflection unit 110 and the optical axis of the first fθ lens 111 and second fθ lens 112. A sub-scanning direction is a direction parallel to the rotational axis of the deflection unit 110.

In addition, a main scanning section is a plane including the optical axis of the first fθ lens 111 and second fθ lens 112 and the main scanning direction. A sub-scanning section is a plane perpendicular to a main scanning section including the optical axis of the first fθ lens 111 and second fθ lens 112. An exposure distribution in the sub-scanning direction is generated for each main scanning exposure by moving (rotating) a photosensitive body in the sub-scanning direction.

The light source 101 has a plurality of light-emitting points. As this light source, for example, an edge emitting type laser or a surface emitting type semiconductor laser such as a VCSEL (Vertical Cavity Surface Emitting Laser) is used.

The aperture stop 102 limits the diameter of a light flux emitted by the light source 101 in the sub-scanning direction.

The collimator lens 103 is an optical element which converts the light flux emitted by the light source 101 into a nearly parallel light flux (or a divergent or convergent light flux).

The light source 101, the aperture stop 102, and the collimator lens 103 constitute a laser unit 104.

The cylindrical lens 105 has a finite power (refractive power) only in a sub-scanning section.

The aperture stop 106 limits the diameter of the light flux emitted by the collimator lens 103 in the main scanning direction.

The light beam splitting element 107 is an optical element having both a transmitting function and a reflecting function. As this element, a half mirror, a wedge prism, a parallel plate, or the like is used. Note that this embodiment uses a wedge prism as the light beam splitting element 107.

The anamorphic lens 108 focuses the light flux reflected by the wedge prism 107.

The light amount detecting unit 109 detects the amount of light emitted by the light source 101. As this unit, a photodiode, a CMOS sensor, or the like is used.

A driving unit (not shown) such as a motor rotates the deflection unit 110 at a constant velocity in a predetermined direction (for example, the direction indicated by "A" in FIG. 1). The deflection unit 110 is constituted by a polygon mirror and the like.

The first fθ lens 111 and the second fθ lens 112 are imaging lenses (anamorphic lenses) having different powers in a main scanning section and a sub-scanning section. The first fθ lens 111 and the second fθ lens 112 constitute a scanning optical system 113 which determines fθ characteristics. The scanning optical system 113 guides a plurality of light fluxes deflected by the deflection unit 110 onto the scanned surface 115.

The dustproof unit 114 is provided to prevent the entrance of dust and the like into a housing (not shown). As this unit, a glass plate or the like is used. The scanned surface 115 is a surface of a photosensitive drum, which is scanned in the direction indicated by "B" in FIG. 1.

Part of the light flux deflected and scanned by the deflection unit 110 strikes the deflection mirror 116, which in turn deflects the part of the light flux toward a synchronous detection device (synchronous detection unit) 123. The first synchronous detection element 117 and the second synchronous detection element 118 are constituted by lenses and the like. The first synchronous detection element 117 and the second synchronous detection element 118 constitute a synchronous detection optical system 119.

The light-shielding unit 120 shields the scanning upstream side of scanned light passing through the synchronous detection optical system 119 so as to limit the light flux entering the light-receiving element 121. As the light-shielding unit 120, a knife edge or the like is used. The light-receiving element 121 receives the light flux limited by the light-shielding unit 120. As this element, a photodiode or the like which detects the timing of scanned light is used. A light-receiving unit 122 is constituted by the light-shielding unit 120 and the light-receiving element 121, and is scanned in the direction indicated by "C" in FIG. 1.

The synchronous detection device 123 is constituted by the synchronous detection optical system 119 and the light-receiving unit 122.

The light-emitting control unit 124 determines the amount of light emitted by the light source 101 and a light-emitting timing based on the light amount information obtained from the light amount detecting unit 109 and the light-emitting timing information obtained from the light-receiving unit 122, and controls the emission of light from the light source 101.

The operation of the optical scanning apparatus 100 will be described next.

First of all, each of a plurality of light fluxes emerging from a plurality of light-emitting points of the light source 101 passes through the aperture stop 102, which limits light fluxes in the sub-scanning direction, and is converted into a nearly parallel light flux by the collimator lens 103. The cylindrical lens 105 then converts the light flux into a convergent light flux in a sub-scanning section. Thereafter, each light flux passes through the aperture stop 106, which limits light fluxes in the main scanning direction. Part of the light flux is reflected by the wedge prism 107, while the remaining part is transmitted through the wedge prism 107. Note that in the first embodiment, each light flux strikes the wedge prism 107 at an angle of 29.28°.

The light flux reflected by the wedge prism 107 strikes the anamorphic lens 108 and then enters the light amount detecting unit 109. On the other hand, the light flux transmitted through the wedge prism 107 enters the deflection unit 110 which is rotating in the direction A.

The light flux which has entered the deflection unit 110 is deflected and scanned by the deflection unit 110, and is formed into an image on the scanned surface through the first fθ lens 111 and the second fθ lens 112. This light flux passes through the dustproof unit 114 and scans the scanned surface 115 at a uniform velocity. Note that since the deflection unit 110 is rotating in the direction A, the deflected and scanned light flux scans the scanned surface 115 in the direction B.

Of the light flux deflected and scanned by the deflection unit 110, light on the scanning start side passes through the first fθ lens 111 as an imaging lens placed nearest to the deflection unit, and then strikes the deflection mirror 116. The light flux reflected by the deflection mirror 116 enters the synchronous detection optical system 119 constituted by a plurality of lenses. Thereafter, the light flux enters the light-receiving unit 122, which is constituted by the light-shielding unit 120 and the light-receiving element 121, while scanning the light-receiving unit 122 in the direction C. This makes the light-receiving unit 122 detect the light-emitting timing of the light source 101.

In this manner, the synchronous detection device 123 detects the scanning timings of a plurality of light fluxes deflected by the deflection unit 110. This device may be configured to detect the scanning timings of at least two or more light fluxes of the plurality of light fluxes deflected by the deflection unit 110.

In this embodiment, the synchronous detection optical system 119 is constituted by the first synchronous detection element (imaging element) 117 formed from a resin and the second synchronous detection element (imaging element) 118 formed from glass. Changes dn/dT in refractive index of the first synchronous detection element 117 and second synchronous detection element 118 with respect to temperature are respectively $-1.1\times10^{-5}$ and $2.5\times10^{-6}$. The first synchronous detection element 117 is a cylindrical lens having a power only in a sub-scanning section, and the second synchronous detection element 118 is a spherical lens having powers both in a main scanning section and a sub-scanning section.

Note that in this embodiment, the light-receiving unit 122 is constituted by the light-shielding unit 120 and the light-receiving element 121. However, the light-receiving unit 122 may be formed from only a synchronous detection sensor as the light-receiving element 121.

In this case, the sensor itself also functions as a light-shielding unit if an end portion of the sensor is placed with careful consideration or a composite sensor obtained by coupling two sensors is used.

Tables 1 to 3 given below show various characteristics of an incidence optical system, scanning optical system, and synchronous detection optical system in this embodiment.

TABLE 1

| Various Characteristics of Light Source 101 | | |
| --- | --- | --- |
| Number of Light-emitting Points | N | 32 |
| Array | (dimension) | 1 |
| Pitch | pitch(mm) | 0.05 |
| Wavelength | λ(nm) | 680 |
| Incidence Deflection to Deflection Surface of Deflection Unit 110 | | p-polarized light |
| Full Width at Half Maximum in Main Scanning Direction | FFPy(°) | 7.93 |
| Full Width at Half Maximum in Sub-scanning Direction | FFPz(°) | 7.93 |

| Stop Shape | | |
| --- | --- | --- |
| | Main Scanning Direction | Sub-scanning Direction |
| Aperture Stop 102 | 4.66 | 0.57 |
| Aperture Stop 106 | 4.86 | ∞ |

| Refractive Index | | |
| --- | --- | --- |
| Collimator Lens 103 | N1 | 1.5777 |
| Cylindrical Lens 105 | N2 | 1.531 |
| Wedge Prism 107 | N3 | 1.531 |
| Anamorphic Lens 108 | N4 | 1.488 |

| Optical Element Shape | | |
| --- | --- | --- |
| | Main Scanning Direction | Sub-scanning Direction |
| Curvature Radius of Incident Surface of Collimator Lens 103 | r1a(mm) −155.00 | −155.00 |
| Curvature Radius of Exit Surface of Collimator Lens 103 | r1b(mm) 44.42 | 44.42 |
| Curvature Radius of Incident Surface of Cylindrical Lens 105 | r2a(mm) ∞ | −48.14 |
| Curvature Radius of Exit Surface of Cylindrical Lens 105 | r2b(mm) ∞ | ∞ |
| Wedge Prism 107 | vertex angle(deg) 4 | −32.00 |
| Curvature Radius of Incident Surface of Anamorphic Lens 108 | r3a(mm) ∞ | |
| Curvature Radius of Exit Surface of Anamorphic Lens 108 | r3b(mm) 17.43 | 17.43 |

| Aspherical Coefficient of Collimator Lens 103 | | |
| --- | --- | --- |
| | Incident Surface | Exit Surface |
| K | 0 | 0 |
| C2 | 0 | 0 |
| C4 | 0 | −1.7756E−06 |
| C6 | 0 | −3.7965E−10 |

TABLE 1-continued

| | | Focal Length | |
|---|---|---|---|
| | | Main Scanning Direction | Sub-scanning Direction |
| Collimator Lens 103 | fcol(mm) | 60.23 | 60.23 |
| Cylindrical Lens 105 | fcyl(mm) | 93.81 | 93.81 |
| Anamorphic Lens 108 | fapc(mm) | 35.70 | 23.66 |

| Layout | | |
|---|---|---|
| Light Source 101 - Aperture Stop 102 | d0(mm) | 15.91 |
| Aperture Stop 102 - Incident Surface of Collimator Lens 103 | d1(mm) | 42.53 |
| Incident Surface of Collimator Lens 103 - Exit Surface of Collimator Lens 103 | d2(mm) | 3.59 |
| Exit Surface of Collimator Lens 103 - Incident Surface of Cylindrical Lens 105 | d3(mm) | 10.54 |
| Incident Surface of Cylindrical Lens 105 - Exit Surface of Cylindrical Lens 105 | d4(mm) | 6.00 |
| Exit Surface of Cylindrical Lens 105 - Aperture Stop 106 | d5(mm) | 63.81 |
| Aperture Stop 106 - Incident Surface of Wedge Prism 107 | d6(mm) | 0.00 |
| Incident Surface of Wedge Prism 107 - Exit Surface of Wedge Prism 107 | d7(mm) | 2.08 |
| Exit Surface of Wedge Prism 107 - Deflection Surface of Deflection Unit 110 | d8(mm) | 25.46 |
| Incident Surface of Wedge Prism 107 - Incident Surface of Anamorphic Lens 108 | d9(mm) | 20.00 |
| Incident Surface of Anamorphic Lens 108 - Exit Surface of Anamorphic Lens 108 | d10(mm) | 3.50 |
| Exit Surface of Anamorphic Lens 108 - Light Amount Detecting Unit 109 | d11(mm) | 35.70 |
| Incident Angle to Wedge Prism 107 | A1(deg) | 29.28 |
| Incident Angle to Deflection Surface of Deflection Unit 110 | A2(deg) | 70.00 |

TABLE 2

| fθ Coefficient Scanning Angle/Field Angle | | |
|---|---|---|
| fθ Coefficient | k(mm/rad) | 200.18 |
| Scanning Width | W(mm) | 335 |
| Maximum Field Angle | θ(deg) | 48 |

| Refractive Index | | |
|---|---|---|
| Refractive Index of First fθ Lens 111 | N5 | 1.5273 |
| Refractive Index of Second fθ Lens 112 | N6 | 1.5273 |

| Scanning Optical Unit/Layout | | |
|---|---|---|
| Deflection Surface of Deflection Unit 110 - Incident Surface of First fθ Lens 111 | d12(mm) | 26.50 |
| Incident Surface of first fθ lens 111 - Exit Surface of First fθ Lens 111 | d13(mm) | 9.60 |
| Exit Surface of First fθ Lens 111 - Incident Surface of Second fθ Lens 112 | d14(mm) | 67.90 |
| Incident Surface of Second fθ Lens 112 - Exit Surface of Second fθ Lens 112 | d15(mm) | 5.50 |
| Exit Surface of Second fθ Lens 112 - Scanned Surface 115 | d16(mm) | 126.67 |
| Deflection Surface of Deflection Unit 110 - Scanned Surface 115 | d total2(mm) | 236.17 |

| Generating Line Shape of First fθ Lens 111 | | Sagittal Line Shape of First fθ Lens 111 | | |
|---|---|---|---|---|
| Incident Surface | Exit Surface | | Incident Surface | Exit Surface |
| Light Source Side | Light Source Side | | Light Source Side | Light Source Side |
| R −7.12389E+01 | −4.14980E+01 | r | −1.00000E+03 | −1.00000E+03 |
| ku 2.17680E+00 | 6.42947E−02 | D2u | 0 | 0 |
| B4u 3.69128E−06 | 2.77878E−06 | D4u | 0 | 0 |

TABLE 2-continued

| | | | | | |
|---|---|---|---|---|---|
| B6u | 8.27275E-11 | 1.17980E-09 | D6u | 0 | 0 |
| B8u | 1.95630E-13 | 2.10270E-13 | D8u | 0 | 0 |
| B10u | 3.54758E-17 | 2.07452E-16 | D10u | 0 | 0 |

| | Side Opposite to Light Source | Side Opposite to Light Source | | Side Opposite to Light Source | Side Opposite to Light Source |
|---|---|---|---|---|---|
| kl | 2.17680E+00 | 6.42947E-02 | D2l | 0 | 0 |
| B4l | 3.69128E-06 | 2.77878E-06 | D4l | 0 | 0 |
| B6l | 8.27275E-11 | 1.17980E-09 | D6l | 0 | 0 |
| B8l | 1.95630E-13 | 2.17551E-13 | D8l | 0 | 0 |
| B10l | 3.54758E-17 | 2.02442E-16 | D10l | 0 | 0 |

| Generating Line Shape of Second fθ Lens 112 | | Sagittal Line Shape of Second fθ Lens 112 | |
|---|---|---|---|
| Incident Surface | Exit Surface | Incident Surface | Exit Surface |
| Light Source Side | Light Source Side | Light Source Side | Light Source Side |

| | | | | | |
|---|---|---|---|---|---|
| R | -8.24438E+02 | 7.68000E+02 | r | -1.00000E+02 | -2.36478E+01 |
| ku | 0 | -5.89704E+02 | D2u | 0 | 7.00884E-05 |
| B4u | 0 | -2.57008E-07 | D4u | 0 | -1.56168E-08 |
| B6u | 0 | 2.17131E-11 | D6u | 0 | 2.15646E-12 |
| B8u | 0 | -1.47843E-11 | D8u | 0 | -1.68590E-16 |
| B10u | 0 | 4.78126E-20 | D10u | 0 | 5.61186E-21 |

| | Side Opposite to Light Source | Side Opposite to Light Source | | Side Opposite to Light Source | Side Opposite to Light Source |
|---|---|---|---|---|---|
| kl | 0 | -5.89704E+02 | D2l | 2.45000E-06 | 1.25282E-04 |
| B4l | 0 | -2.57008E-07 | D4l | -1.68000E-10 | -1.52826E-08 |
| B6l | 0 | 2.17131E-11 | D6l | 0 | 2.83271E+12 |
| B8l | 0 | -1.47843E-11 | D8l | 0 | -3.04294E-16 |
| B10l | 0 | 4.78126E-20 | D10l | 0 | 1.06411E-20 |

TABLE 3

| Refractive Index | | |
|---|---|---|
| First Synchronous detection Lens 117 | N7 | 1.488 |
| Second Synchronous detection Lens 118 | N8 | 1.766 |

| Change in Refractive Index with respect to Temperature | | |
|---|---|---|
| First Synchronous detection Lens 117 | dN7/dT(/K) | -1.10E-05 |
| Second Synchronous detection Lens 118 | dN8/dT(/K) | 2.50E-06 |

| Optical Element Shape | | | |
|---|---|---|---|
| | | Main Scanning Direction | Sub-scanning Direction |
| Curvature Radius of Incident Surface of First Synchronous detection Lens 117 | r1a(mm) | ∞ | 38.80 |
| Curvature Radius of Exit Surface of First Synchronous detection Lens 117 | r1b(mm) | ∞ | ∞ |
| Curvature Radius of Incident Surface of Second Synchronous detection Lens 118 | r2a(mm) | 26.59 | 26.59 |
| Curvature Radius of Exit Surface of Second Synchronous detection Lens 118 | r2b(mm) | ∞ | ∞ |

TABLE 3-continued

| | | Focal Length | |
|---|---|---|---|
| | | Main Scanning Direction | Sub-scanning Direction |
| First Synchronous detection Lens 117 | fBD1(mm) | ∞ | 79.48 |
| Second Synchronous detection Lens 118 | fBD2(mm) | 34.70 | 34.70 |
| Synchronous detection Optical Unit 119 | fBD(mm) | 34.70 | 24.77 |

| | Layout | |
|---|---|---|
| | X | Y |
| Coordinates of Center of Deflection Unit 110 | −12.42 | −6.25 |
| Coordinates of Center of Deflection Mirror 116 | 74.63 | 74.39 |

| | | Distance |
|---|---|---|
| Deflection Mirror 116 - Incident Surface of First Synchronous detection Lens 117 | d2(mm) | 48.40 |
| Incident Surface of First Synchronous detection Lens 117 - Exit Surface of First Synchronous detection Lens 117 | d3(mm) | 3.50 |
| Exit Surface of First Synchronous detection Lens 117 - Incident Surface of Second Synchronous detection Lens 118 | d4(mm) | 0.50 |
| Incident Surface of Second Synchronous detection Lens 118 - Exit Surface of Second Synchronous detection Lens 118 | d5(mm) | 2.70 |
| Exit Surface of Second Synchronous detection Lens 118 - Light-Shielding Unit 120 | d6(mm) | 28.34 |
| Light-shielding Unit 120 - Light-Receiving Unit 121 | d7(mm) | 3.00 |

Note that in Table 1 to 3, an optical axis direction when the intersection between each lens surface and the optical axis is an origin, an axis perpendicular to the optical axis in a main scanning section, and an axis perpendicular to the optical axis in a sub-scanning section are respectively defined as the X-axis, the Y-axis, and the Z-axis. In addition, "E-x" in Tables 1 to 3 means "×10$^{-x}$".

The collimator lens 103 is a rotationally symmetrical glass mold lens having an aspherical shape for aberration correction. This shape is represented by equation (1) given below.

$$x = \frac{\frac{\sqrt{y^2+z^2}}{R}}{1+\sqrt{1-(1+k)\left(\frac{\sqrt{y^2+z^2}}{R}\right)^2}} + C_2(y^2+z^2) + C_4(y^2+z^2)^2 + C_6(y^2+z^2)^3 \quad (1)$$

Where R is a curvature radius, k is an eccentricity, $C_i$ (i=2, 4, 6) is an aspherical coefficient.

Equation (2) given below represents the aspherical shape of a main scanning section of each lens surface of the first fθ lens 111 and second fθ lens 112.

$$x = \frac{y^2/R}{1+\left(1-(1+k)(y/R)^2\right)^{1/2}} + \sum_{i=4}^{16} B_i y^i \quad (2)$$

Where R is a curvature radius, k is an eccentricity, $B_i$ (i=4, 6, 8, ..., 16) is an aspherical coefficient.

If the coefficient $B_i$ differs on the positive side and the negative side with respect to y, a coefficient on the positive side is added with the suffix "u" (that is, $B_{iu}$), and a coefficient on the negative side/end side is added with the suffix "l" (that is, $B_{il}$), as indicated by Table 2.

Equation (3) given below represents the aspherical shape of a sub-scanning section of each lens surface of the incident and exit surfaces of the first fθ lens 111 and the incident surface of the second fθ lens 112.

$$S = \frac{z^2/r'}{1+\left(1-(z/r')^2\right)^{1/2}} \quad (3)$$

That is, S in equation (3) corresponds to the sagittal line shape defined in a plane which includes a surface normal of a generating line at an arbitrary point on the generating line and is perpendicular to a main scanning section.

Note that a curvature radius r' of the sub-scanning section in equation (3) continuously changes according to the y-coordinate of the lens surface, as indicated by equation (4) given below.

$$r' = r\left(1 + \sum_{j=2}^{10} D_j y^j\right) \quad (4)$$

Where r is the curvature radius of the sub-scanning section on the optical axis and $D_j$ (j=2, 4, 6, 8, 10) is the change coefficient of the curvature radius of the sub-scanning section. If the coefficient $D_j$ differs on the positive side and the negative side with respect to y, a coefficient on the positive side is added with the suffix "u" (that is, $D_{ju}$), and a coefficient on the negative side/end side is added with the suffix "l" (that is, $D_{jl}$), as indicated by table 2.

Likewise, equation (5) given below represents the aspherical shape of the sub-scanning section of the exit surface of the second fθ lens 112.

$$S = \frac{z^2/r'}{1 + \left(1 - (z/r')^2\right)^{1/2}} \quad (5)$$

That is, S in equation (5) corresponds to the sagittal line shape defined in a plane which includes a surface normal of a generating line at an arbitrary point on the generating line and is perpendicular to the main scanning section.

Note that a curvature radius r' of the sub-scanning section in equation (5) continuously changes according to the y-coordinate of the lens surface, as indicated by equation (6) given below.

$$\frac{1}{r'} = \frac{1}{r} + \sum_{j=2}^{10} D_j y^j \quad (6)$$

Where r is the curvature radius of the sub-scanning section on the optical axis and $D_j$ (j=2, 4, 6, 8, 10) is the change coefficient of the curvature radius of the sub-scanning section. If the coefficient $D_j$ differs on the positive side and the negative side with respect to y, a coefficient on the positive side is added with the suffix "u" (that is, $D_{ju}$), and a coefficient on the negative side/end side is added with the suffix "l" (that is, $D_{jl}$), as indicated by table 2.

Note that the sub-scanning section continuously changes with respect to the y-coordinate of the lens surface, and has the spherical shape represented by a 10th-order function with respect to y.

The optical scanning apparatus 100 according to this embodiment allows the synchronous detection device 123 to have a focal length of 34.70 mmm, while the scanning optical system 113 has a focal length (fθ coefficient) of 200.18 mm/rad in the main scanning direction. This achieves a reduction in the size of the optical scanning apparatus 100. In addition, in the optical scanning apparatus 100 according to this embodiment, the deflection mirror 116 deflects a light flux to guide it to the synchronous detection device 123. This arrangement is also suitable for a reduction in the size of the optical scanning apparatus 100. In addition, in the optical scanning apparatus 100 according to the embodiment, the second synchronous detection element 118 is placed on a side near the light-receiving unit 122. This makes it possible to set a short focal length for the synchronous detection optical system 119. This arrangement is also suitable for a reduction in the size of the optical scanning apparatus 100.

In order to further reduce the size of the optical scanning apparatus 100, the optical scanning apparatus 100 according to this embodiment is configured to cause a light flux entering the synchronous detection device 123 to pass through an end portion of the first fθ lens 111 (that is, the fθ lens nearest to the deflection unit 110 side). This arrangement makes it unnecessary to form a portion through which a light flux for synchronous detection passes outside the first fθ lens 111 even if the light flux is spread in the main scanning direction to achieve a reduction in spot diameter. This can guide a light flux for synchronous detection to the synchronous detection device 123 without being blocked by part of an optical component and without increasing the size of the optical scanning apparatus 100.

The difference between the detection errors caused as the focal length of the synchronous detection device 123 differs in the optical scanning apparatus 100 according to this embodiment will be described next.

Figure 2:
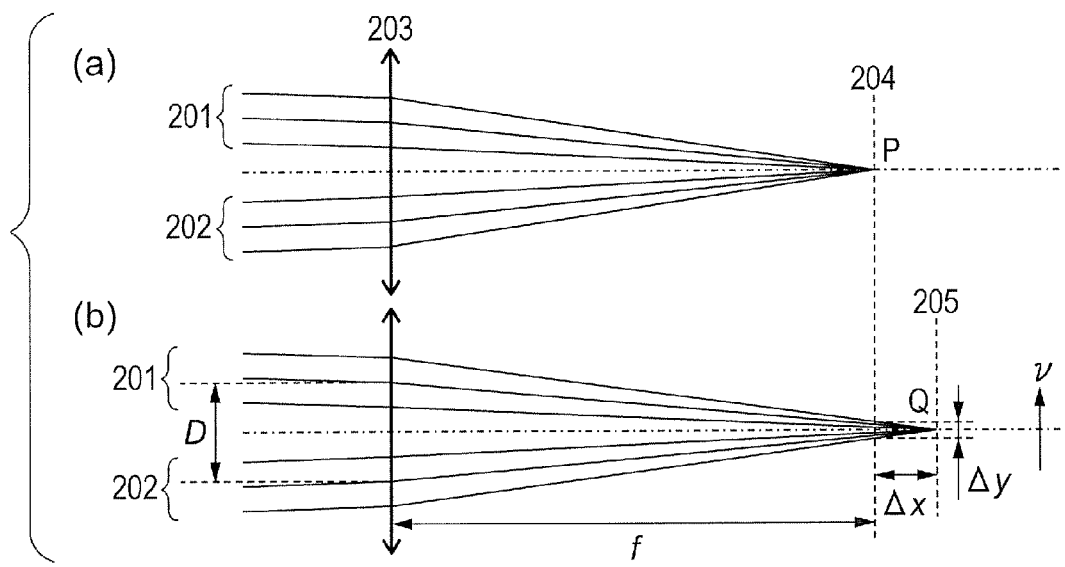
FIG. 2 shows schematic views in main scanning sections to explain synchronous detection errors concerning a plurality of light fluxes in an ideal state and a temperature rise period of a synchronous detection device 123.
Figure 3:
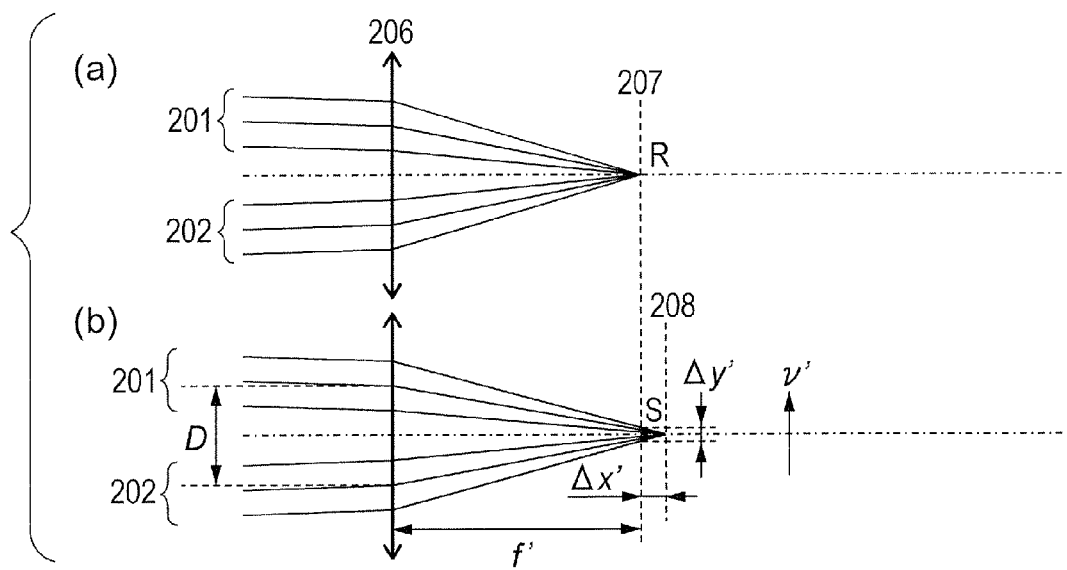
FIG. 3 shows schematic views in main scanning sections to explain synchronous detection errors concerning a plurality of light fluxes in an ideal state and a temperature rise period of the synchronous detection device 123.

Note that (a) and (b) in FIG. 2 and (a) and (b) in FIG. 3 indicate schematic views in main scanning sections to explain synchronous detection errors of a plurality of light fluxes in ideal states and temperature rise periods of the synchronous detection device 123. In FIG. 2, (a) indicates a schematic view showing how a plurality of light fluxes are focused when the focal length of the synchronous detection optical system 119 in the main scanning direction is long in an ideal state. In FIG. 2, (b) indicates a schematic view showing how a plurality of light fluxes are focused when the focal length of the synchronous detection optical system 119 in the main scanning direction is long in a temperature rise period. In FIG. 3, (a) indicates a schematic view showing how a plurality of light fluxes are focused when the focal length of the synchronous detection optical system 119 in the main scanning direction is short in an ideal state. In FIG. 3, (b) indicates a schematic view showing how a plurality of light fluxes are focused when the focal length of the synchronous detection optical system 119 in the main scanning direction is short in a temperature rise period.

A light flux 201 is a preceding light flux of the plurality of light fluxes deflected by the deflection unit 110.

A light flux 202 is a succeeding light flux of the plurality of light fluxes deflected by the deflection unit 110.

An optical principal plane 203 is formed by the synchronous detection optical system 119 when the focal length is long (the focal length in this case is represented by f).

A detection plane 204 indicates the position of the light-shielding unit 120, at which light fluxes are focused in an ideal state, and determines the light-emitting synchronization timing of the light source 101.

A virtual plane 205 includes the focal point of a light flux in a temperature rise period.

An optical principal plane 206 is formed by the synchronous detection optical system 119 when the focal length is short (the focal length in this case is represented by f') as in this embodiment.

A detection plane 207 indicates the position of the light-shielding unit 120, at which light fluxes are focused in an ideal state, and determines the light-emitting synchronization timing of the light source 101.

A virtual plane 208 includes the focal point of a light flux in a temperature rise period.

For example, referring to (a) in FIG. 2, the preceding light flux 201 of the plurality of light fluxes deflected by the deflection unit 110 enters the synchronous detection device 123 before the remaining light fluxes and is detected by the detection plane 204. Subsequently, after the lapse of a predetermined time, the succeeding light flux 202 of the plurality of light fluxes enters the synchronous detection device 123 and is detected on the detection plane 204.

Note that (a) and (b) in FIG. 2 respectively show how the preceding light flux 201 and the succeeding light flux 202 are focused at a point P on the detection plane 204 and a point Q on the virtual plane 205. In addition, (a) and (b) in FIG. 3 respectively show how the preceding light flux 201 and the succeeding light flux 202 are focused at a point R on the detection plane 207 and a point S on the virtual plane 208. Note that the light fluxes 201 and 202 reach the respective points at different times.

As indicated by (b) in FIG. 2 and (b) in FIG. 3, when the temperature of the synchronous detection device 123 rises, focus fluctuations occur by $\Delta x$ and $\Delta x'$, respectively. Accompanying these fluctuations, detection timings of the light fluxes 201 and 202 on the detection planes 204 and 207 shift, and hence detection errors occur by $\Delta y$ and $\Delta y'$, respectively.

In this case, the ratio between focal lengths f and f' and the ratio between the focus fluctuation amounts $\Delta x$ and $\Delta x'$ are represented by equation (7) given below.

$$\frac{f}{f'} = \frac{\Delta x}{\Delta x'} \quad (7)$$

In the case indicated by (b) in FIG. 2, the relationship between the focus fluctuation amount $\Delta x$ and the detection error $\Delta y$ is represented by equation (8) given below:

$$\frac{\Delta y}{\Delta x} = \frac{D}{f + \Delta x} \quad (8)$$

Where D is the distance between the preceding light flux 201 and the succeeding light flux 202 on a principal plane.

Likewise, in the case indicated by (b) in FIG. 3, the relationship between the focus fluctuation amount $\Delta x'$ and the detection error $\Delta y'$ is represented by equation (9) given below:

$$\frac{\Delta y'}{\Delta x'} = \frac{D}{f' + \Delta x'} \quad (9)$$

According to equations (7), (8), and (9), therefore, the relationship between the detection errors $\Delta y$ and $\Delta y'$ is represented by equation (10) given below.

$$\frac{\Delta y}{\Delta y'} = \frac{\frac{f'}{\Delta x'} + 1}{\frac{f}{\Delta x} + 1} = 1 \quad (10)$$

It is obvious from this that if the amount of change in the temperature of the synchronous detection device 123 remains the same, detection errors become constant regardless of the focal length f of the synchronous detection optical system 119.

Note however that if the focal length f changes, a scanning velocity v at which the light-receiving unit 122 is scanned changes.

More specifically, the relationship between the focal length f (mm) and the scanning velocity v (mm/s) is represented by equation (11) given below using a constant a ((mm/s)/(mm)).

$$v = af \quad (11)$$

That is, as the focal length f increases, the scanning velocity v increases.

Referring to the cases indicated by (b) in FIG. 2 and (b) in FIG. 3, when the focal length is given by f, the scanning velocity is given by v (=af), whereas when the focal length is given by f', the scanning velocity is given by v' (=af'). Note that v>v'.

According to equation (10), the detection errors $\Delta y$ and $\Delta y'$ become the same value regardless of the focal length f. However, as indicated by equation (11), since the scanning velocity v is proportional to the focal length f, detection errors $\Delta t$ (=$\Delta y/v$=$\Delta y/(af)$) and $\Delta t'$ (=$\Delta y'/v'$=$\Delta y'/(af')$) do not become the same value in terms of time. For this reason, as the focal length f decreases, the detection error $\Delta t$ increases. That is, $\Delta t'$>$\Delta t$.

For this reason, in a multibeam optical system in which the synchronous detection optical system 119 has a short focal length as in this embodiment, if a focus fluctuation occurs with a rise in the temperature of the synchronous detection device 123, the detection errors of the preceding light flux 201 and succeeding light flux 202 increase.

Since the light-receiving unit 122 aims at synchronous detection in the main scanning direction, it is preferable to reduce detection errors in the main scanning direction. For this purpose, the synchronous detection optical system 119 is preferably constituted by a plurality of imaging units exhibiting different changes in refractive index with respect to the temperatures. It is possible to reduce detection errors accompanying a rise in the temperature of the synchronous detection device 123 by, in particular, forming an imaging unit, of a plurality of imaging units, which has the largest refractive power in a main scanning section by using a material, exhibiting a small amount of change in refractive index with respect to temperature, such as glass. In addition, it is possible to achieve a reduction in cost by using a resin lens, which is made of a material exhibiting a relatively large amount of change in refractive index with respect to temperatures but can be manufactured at low cost, as an imaging unit which is free from detection errors even under the influence of a rise in temperature and has a refractive power in a sub-scanning section.

For the above reasons, this embodiment uses the first synchronous detection element (second imaging element) 117 made of a resin and the second synchronous detection element (first imaging element) 118 made of glass so as to maximize the refractive power in a main scanning section of an imaging unit, of a plurality of imaging units, which exhibits the smallest change in refractive index with respect to temperature.

As described above, using the arrangement according to this embodiment can provide an optical scanning apparatus which can achieve a reduction in size, an increase in speed, and an increase in resolution while reducing dot misalignment caused by a reduction in spot diameter and environmental fluctuations.

That is, in consideration of the influence of a change in temperature, it is difficult in a conventional optical scanning apparatus to design an optical system for a synchronous detection device having a short focal length. However, the optical scanning apparatus according to the present invention can shorten the focal length by forming a synchronous detection imaging unit using a material exhibiting a small amount of change in refractive index with respect to temperatures. This makes it possible to reduce the size of the synchronous detection device, and furthermore, the optical scanning apparatus.

Note that this embodiment uses the first synchronous detection element 117 made of a resin and the second synchronous detection element 118 made of glass as a plurality of imaging units. However, the present invention is not limited to this, and may use three or more imaging units.

In addition, of the plurality of imaging units in this embodiment, the second synchronous detection element 118 is placed on a side near the light-receiving unit 122. However, the present invention is not limited to this. If three or more imaging units are used, it is preferable to place, nearest to the light-receiving unit side, an imaging unit, of the plurality of imaging units, which has the largest refractive power in a main scanning section and exhibits the smallest change in refractive index with respect to temperature.

The second synchronous detection element 118 in this embodiment is a spherical lens having powers both in a main scanning section and a sub-scanning section. However, the present invention is not limited to this, and the second synchronous detection element may be a lens having a power only in a main scanning section.

In addition, at least one surface of at least one imaging unit of the plurality of imaging units may be formed from an anamorphic surface.

Figure 4:
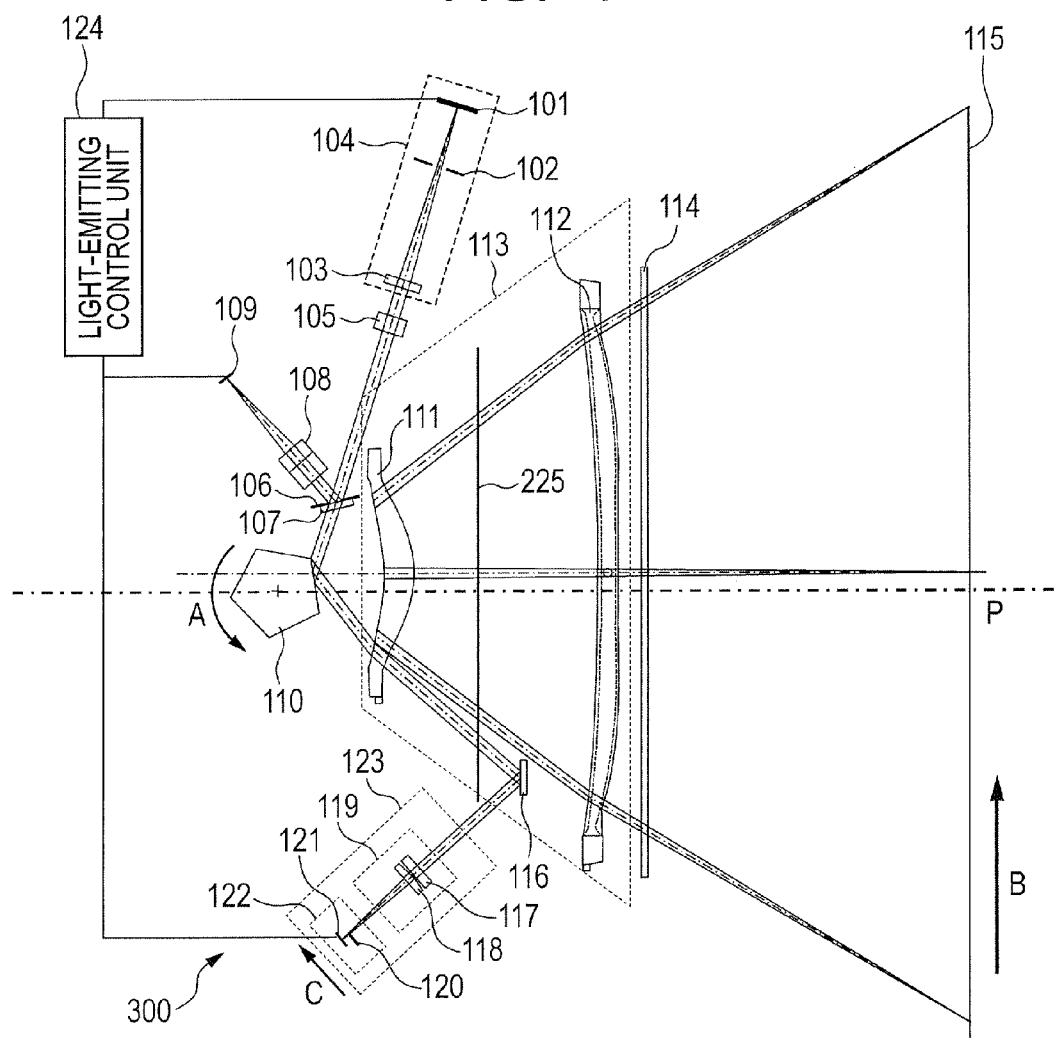
FIG. 4 is a schematic view showing an optical scanning apparatus 300 according to the second embodiment of the present invention which is developed on a main scanning section.

FIG. 4 is a schematic view showing an optical scanning apparatus 300 according to the second embodiment of the present invention which is developed on a main scanning section.

The optical scanning apparatus 300 has the same arrangement as that of the optical scanning apparatus 100 according to the first embodiment except that it includes a deflection mirror 225. Therefore, the same reference numerals denote the same constituent elements, and a description of them will be omitted.

Figure 5:
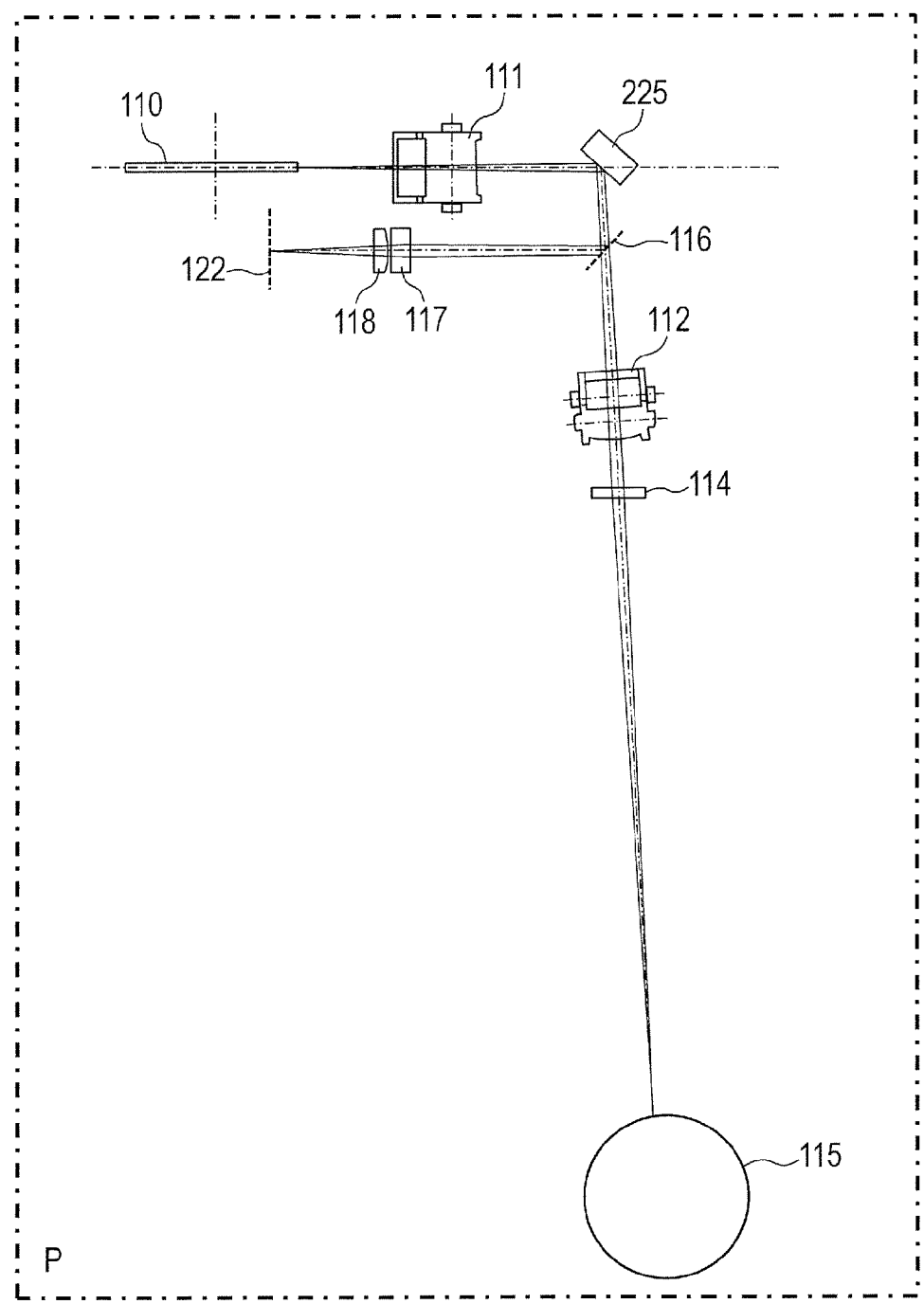
FIG. 5 is a sectional view taken along a sub-scanning section P of the optical scanning apparatus 300 according to the second embodiment of the present invention.

FIG. 5 is a sectional view of the optical scanning apparatus 300 according to the second embodiment of the present invention taken along a sub-scanning section P.

As shown in FIG. 5, the light fluxes which are deflected and scanned by a deflection unit 110 and pass through a first fθ lens 111 are reflected downward by the deflection mirror 225. Thereafter, of the light fluxes deflected and scanned by the deflection unit 110, the light on the scanning start side is reflected by a deflection mirror 116 toward the synchronous detection device 123.

As described above, as the temperature of a synchronous detection device 123 rises, a detection error occurs in a light-receiving unit 122. It is therefore possible to reduce detection errors by suppressing a rise in the temperature of the synchronous detection device 123 itself.

Heat sources which cause a rise in the temperature of the synchronous detection device 123 include a light source 101 and a motor (not shown) for the deflection unit 110. For this reason, a synchronous detection optical system 119 is preferably placed at a position apart from the light source 101 as a heat source. In addition, the sub-scanning section P which includes the central axis of the deflection unit 110 and is parallel to the optical axis of the first fθ lens 111 preferably exists between the light source 101 and the synchronous detection device 123. This arrangement makes the synchronous detection device 123 robust against the influence of heat generation by the light source 101 as a heat source, and hence suppresses the amount of rise in the temperature of the synchronous detection device 123, thereby reducing detection errors in the light-receiving unit 122.

In addition, the synchronous detection device 123 is preferably placed at a position apart from the deflection unit 110 as a heat source. For this reason, the synchronous detection device 123 is preferably placed other than on a plane which includes the optical path of a light flux which strikes or is reflected by the deflection surface of the deflection unit 110 and is perpendicular to the rotational axis of the deflection unit 110. This arrangement makes the synchronous detection device 123 robust against the influence of heat generation by the deflection unit 110 as a heat source, and hence suppresses the amount of rise in the temperature of the synchronous detection device 123, thereby reducing detection errors in the light-receiving unit 122.

In addition, if a VCSEL is used as the light source 101 to speed up the optical scanning apparatus 300, the light source 101 generates a very large amount of heat. In such a case, in the optical scanning apparatus 300 according to this embodiment, inequality (12) represents conditions among a temperature $T_1$ near the light source 101, a temperature $T_2$ near the deflection unit 110, and a temperature $T_3$ near the synchronous detection optical system 119 at the time of the operation of the optical scanning apparatus 300.

$$T_1 > T_2 > T_3 \qquad (12)$$

According to the relationship represented by inequality (12), therefore, the synchronous detection device 123 becomes robust against the influence of heat generation by the light source 101 and the deflection unit 110 as heat sources, and hence the amount of rise in the temperature of the synchronous detection device 123 decreases, thereby reducing detection errors in the light-receiving unit 122.

Figure 6:
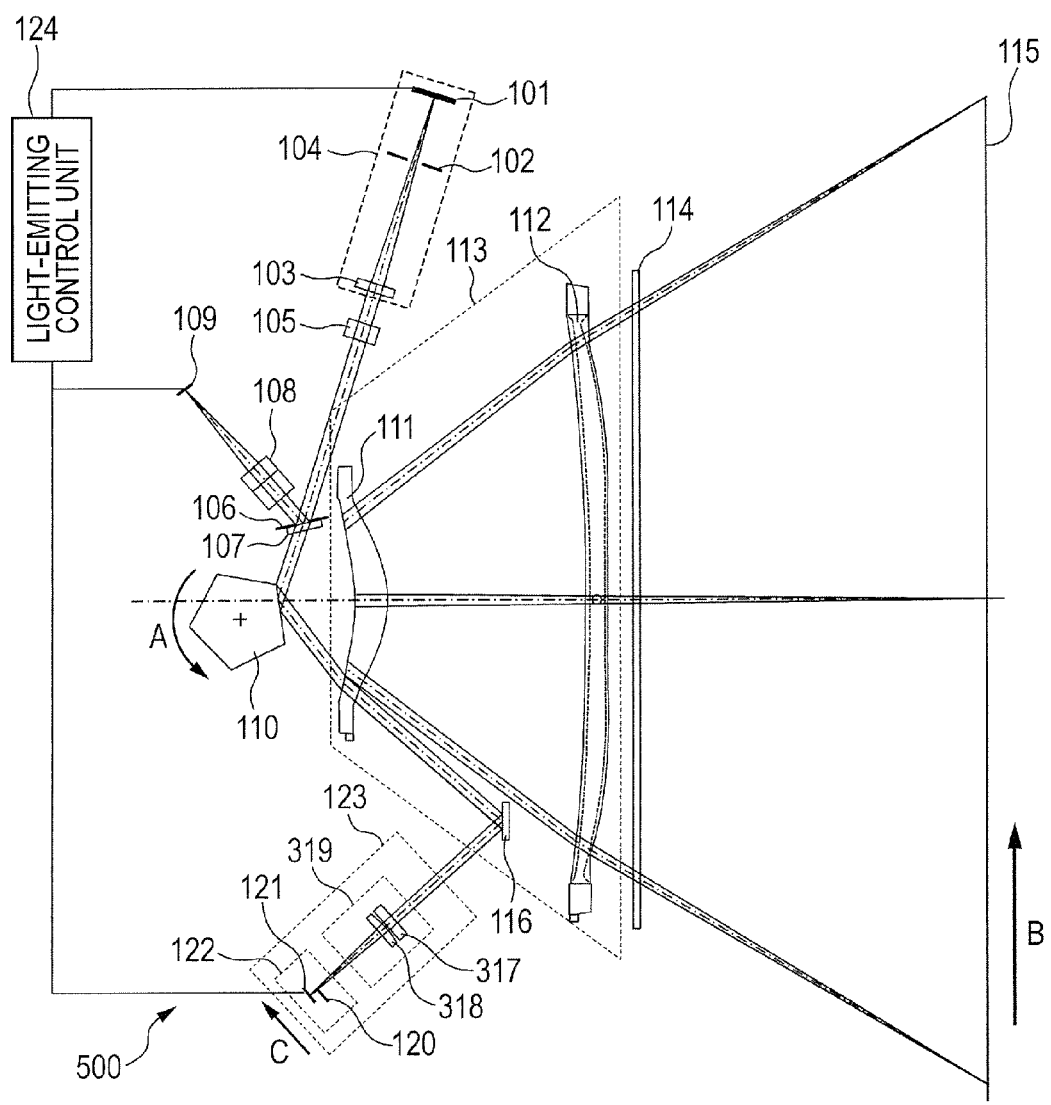
FIG. 6 is a schematic view of an optical scanning apparatus 500 according to the third embodiment of the present invention.

FIG. 6 is a schematic view of an optical scanning apparatus 500 according to the third embodiment of the present invention.

The optical scanning apparatus 500 has the same arrangement as that of the optical scanning apparatus 100 except that it includes a first synchronous detection optical system 317 made of a resin and a second synchronous detection optical system 318 made of glass in a synchronous detection optical system 319 in place of the first synchronous detection optical system 117 and the second synchronous detection optical system 118. For this reason, the same reference numerals denote the same constituent elements of the optical scanning apparatus 500, and a description of them will be omitted.

Figure 7A:
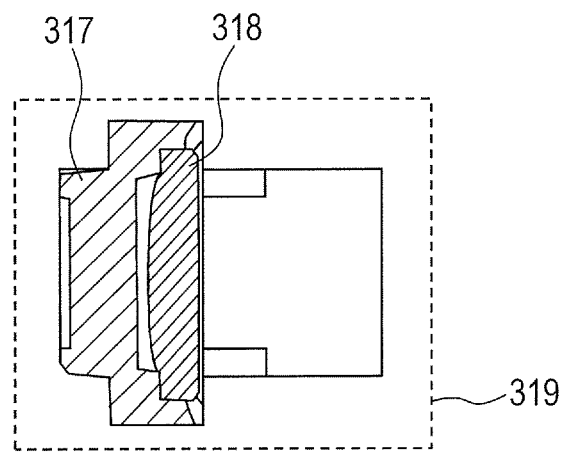
FIG. 7A is a view showing a main scanning section of a synchronous detection optical system 319.
Figure 7B:
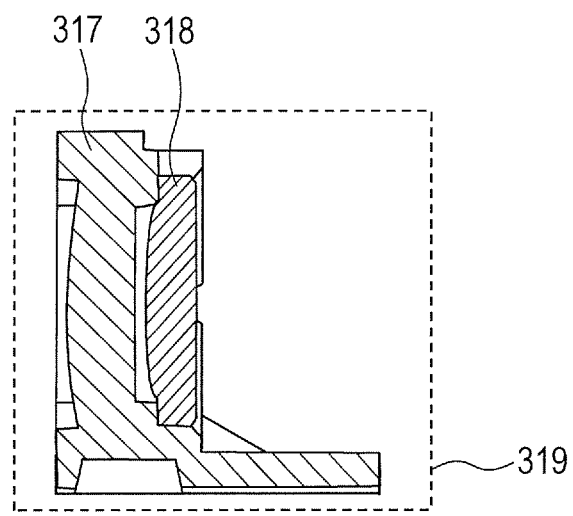
FIG. 7B is a view showing a sub-scanning section of the synchronous detection optical system 319.

FIGS. 7A and 7B are views showing respectively a main scanning section and a sub-scanning section of the synchronous detection optical system 319.

In general, a resin lens can be manufactured by resin molding at low cost, and allows a portion other than a mirror surface portion to be arbitrarily shaped.

In contrast, it is difficult to arbitrarily process the outer shape of a glass lens.

In general, therefore, in order to accurately mount a glass lens in an optical scanning apparatus, it is necessary to use another member. As in this embodiment, however, forming a lens barrel portion on the first synchronous detection optical system 317 (lens unit) made of a resin can accurately mount the second synchronous detection optical system 318 made of glass without requiring another member.

Note that in this embodiment, the second synchronous detection optical system 318 is mounted in the lens barrel portion of the first synchronous detection optical system 317. However, if three or more synchronous detection optical systems are provided, a plurality of synchronous detection optical systems may be mounted in the lens barrel portion of the first synchronous detection optical system made of a resin.

Note that an image forming apparatus (not shown) including the optical scanning apparatus described above is also incorporated in the scope of the present invention. For example, the image forming apparatus includes, in addition to the optical scanning apparatus, a printer controller which converts the code data input from an external device into an image signal and inputs the image signal to the optical scanning apparatus, and a photosensitive body placed at the position of a scanned surface in place of the scanned surface. In addition, the image forming apparatus includes a charging unit and a developing unit. The charging unit uniformly charges the surface of the photosensitive body. The optical scanning apparatus exposes the surface of the photosensitive body, which is charged by the charging unit, to light to form an electrostatic latent image on the photosensitive surface. The developing unit develops the electrostatic latent image as a toner image. The image forming apparatus further includes a transfer unit which transfers the toner image on the surface of the photosensitive body developed by the developing unit onto a printing medium, and a fixing unit which fixes the toner image, transferred onto the printing medium by the transfer unit, on the printing medium.

In the optical scanning apparatus including the light source having a plurality of light-emitting points according to the present invention, the imaging unit, of the plurality of imaging units, which exhibits the smallest change in refractive index with respect to temperature has the largest refractive power in a main scanning section. This makes it possible to reduce detection errors in the synchronous detection of a plurality of light fluxes which are caused by temperature fluctuations, and to achieve high resolution.

Although the preferred embodiments of the present invention have been described above, the present invention is not limited to the above embodiments and various changes and modifications can be made within the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162502, filed Aug. 5, 2013, which is hereby incorporated by reference herein in its entirety.

What is claimed is:

1. An optical scanning apparatus comprising:
a light source having a plurality of light-emitting points;
a deflection unit with a first deflection surface configured to deflect a plurality of light fluxes emitted by the plurality of light-emitting points;
a scanning optical system configured to guide the plurality of light fluxes deflected by the first deflection surface onto a scanned surface; and
a synchronous detection unit configured to detect light fluxes from at least two light-emitting points deflected by the first deflection surface,
wherein the synchronous detection unit has a plurality of imaging elements including first and second imaging elements made of materials different from each other, and
wherein the first imaging element, of the plurality of imaging elements, exhibits a smallest change in refractive index with respect to temperatures and has a largest refractive power in a main scanning section.

2. An apparatus according to claim 1, wherein the first imaging element is made of glass.

3. An apparatus according to claim 1, wherein the second imaging element is made of a resin.

4. An apparatus according to claim 3, wherein the second imaging element includes a lens portion contributing to imaging and a lens barrel portion configured to mount the first imaging element thereon.

5. An apparatus according to claim 1, wherein the synchronous detection unit is placed other than on a section which is perpendicular to a rotational axis of the deflection unit and passes through the center of the first deflection surface.

6. An apparatus according to claim 1, wherein the synchronous detection unit includes a light-receiving unit configured to receive light fluxes from the plurality of imaging elements, and the first imaging element of the plurality of imaging elements is placed at a position nearest to the light-receiving unit.

7. An apparatus according to claim 1, wherein a focal length of the synchronous detection unit is shorter than a focal length of the scanning optical system.

8. An apparatus according to claim 1, wherein the scanning optical system includes a plurality of scanning optical elements, and a light flux entering the synchronous detection unit passes through an end portion of a scanning optical element, of the plurality of scanning optical elements, which is located nearest to the deflection unit.

9. An apparatus according to claim 1, wherein at least one of the plurality of imaging elements has a refractive power only in a section perpendicular to a rotational axis of the deflection unit.

10. An apparatus according to claim 9, wherein the first imaging element has a refractive power only in a section perpendicular to the rotational axis of the deflection unit.

11. An apparatus according to claim 1, wherein at least one of the plurality of imaging elements has a refractive power only in a section perpendicular to a main scanning direction.

12. An apparatus according to claim 1, wherein at least one of the plurality of imaging elements has an anamorphic surface.

13. An apparatus according to claim 1, wherein at least one of the plurality of imaging elements differs in a change in refractive index with respect to temperatures from the remaining imaging elements.

14. An apparatus according to claim 1, wherein the light source and the synchronous detection unit are arranged to sandwich a section, the section including a rotational axis of the deflection unit and being parallel to an optical axis of the scanning optical system.

15. An apparatus according to claim 1, wherein when the optical scanning apparatus operates, letting T1 be a temperature near the light source, T2 be a temperature near the deflection unit, and T3 be a temperature near the synchronous detection unit, a condition $$T1 > T2 > T3$$

is satisfied.

16. An apparatus according to claim 1, wherein the light source comprises a surface-emitting type semiconductor laser.

17. An image forming apparatus comprising:
- an optical scanning apparatus including a light source having a plurality of light-emitting points, a deflection unit with a first deflection surface configured to deflect a plurality of light fluxes emitted by the plurality of light-emitting points, a scanning optical system configured to guide the plurality of light fluxes deflected by the first deflection surface onto a scanned surface, and a synchronous detection unit configured to detect light fluxes from at least two light-emitting points deflected by the first deflection surface, wherein the synchronous detection unit has a plurality of imaging elements including first and second imaging elements made of materials different from each other, and wherein the first imaging element, of the plurality of imaging elements, exhibits a smallest change in refractive index with respect to temperatures and has a largest refractive power in a main scanning section;
- a developing unit configured to develop an electrostatic latent image into a toner image, the electrostatic latent image being formed on the scanned surface by the optical scanning apparatus;
- a transfer unit configured to transfer the toner image developed by the developing unit onto a printing medium; and
- a fixing unit configured to fix the toner image, transferred by the transfer unit, on the printing medium.

18. An apparatus according to claim 17, further comprising a printer controller configured to convert code data input from an external device into an image signal and input the image signal to the optical scanning apparatus.

* * * * *